United States Patent
Woods et al.

(10) Patent No.: US 10,072,694 B2
(45) Date of Patent: Sep. 11, 2018

(54) SYSTEMS FOR IN-PROCESS QUALITY CONTROL DURING DRILL-FILL ASSEMBLY

(71) Applicant: THE BOEING COMPANY, Huntington Beach, CA (US)

(72) Inventors: Mark A. Woods, Renton, WA (US); John A. Davies, Jr., Renton, WA (US); Edward E. Feikert, St. Charles, MO (US); John E. Inman, Frontenac, MO (US); Elizabeth Denise Blahut, Renton, WA (US); Jeffry G. Bickford, Federal, WA (US)

(73) Assignee: The Boeing Company, Chicago, IL (US)

( * ) Notice: Subject to any disclaimer, the term of this patent is extended or adjusted under 35 U.S.C. 154(b) by 616 days.

(21) Appl. No.: 14/685,263

(22) Filed: Apr. 13, 2015

(65) Prior Publication Data
US 2015/0211566 A1  Jul. 30, 2015

Related U.S. Application Data

(62) Division of application No. 13/183,670, filed on Jul. 15, 2011, now Pat. No. 9,032,602.

(51) Int. Cl.
*B23Q 17/00* (2006.01)
*F16B 33/00* (2006.01)
(Continued)

(52) U.S. Cl.
CPC ............ *F16B 33/00* (2013.01); *B21J 15/142* (2013.01); *B21J 15/285* (2013.01);
(Continued)

(58) Field of Classification Search
CPC ....... B23P 19/065; B23P 19/10; B23P 19/105; B23P 23/14; B23P 23/147;
(Continued)

(56) References Cited

U.S. PATENT DOCUMENTS 3,812,757 A   4/1974 Reiland
4,102,182 A   7/1978 Brown et al.
(Continued)

FOREIGN PATENT DOCUMENTS

DE   4429225 A1   2/1996
EP   0338117 A2   10/1989
(Continued)

OTHER PUBLICATIONS

CN Second Office Action for related application 201210243133.2 dated Jun. 30, 2016; 18 pp.
(Continued)

*Primary Examiner* — Sarang Afzali
*Assistant Examiner* — Darrell C Ford
(74) *Attorney, Agent, or Firm* — Armstrong Teasdale LLP

(57) ABSTRACT

A fastener insertion system, for use with an assembly stack-up, includes a fastener and an end effector. The end effector includes a drill bit for drilling a hole through the stack-up, a probe for determining a stack-up parameter, and a fastener feed head for installing the fastener into the hole and applying rotational torque to complete fastener installation. The fastener insertion system also includes a processing device and an angle sensor communicatively coupled to the processing device and to the end effector. The processing device is programmed to measure, with the rotation angle sensor, the angular displacement required to complete fastener installation and to transmit a signal representative of the measured angular displacement from the angle sensor to the processing device. The processing device is also programmed to compare the measurement of angular displacement required to complete fastener installation to a range of angular displacement indicative of correct fastener installation.

9 Claims, 13 Drawing Sheets

(51) Int. Cl.
   *B21J 15/28*    (2006.01)
   *B23P 19/06*    (2006.01)
   *B21J 15/14*    (2006.01)
   *B25B 27/00*    (2006.01)
   *F16B 19/10*    (2006.01)
   *G01B 5/24*     (2006.01)
   *G01L 5/24*     (2006.01)

(52) U.S. Cl.
   CPC ........ *B23P 19/065* (2013.01); *B25B 27/0014* (2013.01); *F16B 19/1054* (2013.01); *F16B 19/1072* (2013.01); *G01B 5/24* (2013.01); *G01L 5/24* (2013.01); *Y10T 29/49764* (2015.01); *Y10T 29/49766* (2015.01); *Y10T 29/49767* (2015.01)

(58) Field of Classification Search
   CPC ......... Y10T 29/49764; Y10T 29/49766; Y10T 29/49767; B25B 23/147; B25B 23/00; B25B 23/02; B25B 27/0014; F16B 19/1054; F16B 19/1072; B21J 15/142; B21J 15/285
   USPC ...... 29/407.01, 407.02, 407.03; 81/429, 469, 81/479; 411/504, 506
   See application file for complete search history.

(56) References Cited

U.S. PATENT DOCUMENTS

| | | | |
|---|---|---|---|
| 4,832,548 A * | 5/1989 | Strobel | F16B 19/1063 411/38 |
| 4,955,119 A | 9/1990 | Bonomi et al. | |
| 5,123,792 A | 6/1992 | Strobel | |
| 5,244,406 A | 9/1993 | Vranish | |
| 5,404,643 A | 4/1995 | Rice | |
| 5,502,883 A | 4/1996 | Ohmi et al. | |
| 5,634,751 A | 6/1997 | Stencel et al. | |
| 5,729,906 A | 3/1998 | Banks et al. | |
| 6,172,374 B1 | 1/2001 | Banks et al. | |
| 6,213,698 B1 | 4/2001 | Cosenza | |
| 6,782,594 B2 | 8/2004 | Shoberg | |
| 6,868,757 B2 | 3/2005 | Hufnagl et al. | |
| RE41,185 E | 3/2010 | Gilmore et al. | |
| 7,958,611 B2 | 6/2011 | Friberg et al. | |
| 2001/0037550 A1 | 11/2001 | Shoberg | |
| 2003/0063291 A1 | 4/2003 | Bloch et al. | |
| 2005/0049126 A1 * | 3/2005 | Everson | B23Q 3/15513 483/47 |
| 2005/0116105 A1 | 6/2005 | Munk et al. | |
| 2006/0225484 A1 | 10/2006 | Gleman et al. | |
| 2006/0241815 A1 | 10/2006 | Carlin et al. | |
| 2007/0243037 A1 | 10/2007 | Pratt | |
| 2008/0024125 A1 | 1/2008 | Feikert et al. | |
| 2008/0155807 A1 | 7/2008 | Toh et al. | |
| 2008/0178450 A1 | 7/2008 | Friberg et al. | |
| 2009/0226278 A1 | 9/2009 | Pratt | |
| 2010/0257720 A1 | 10/2010 | Schiffler et al. | |
| 2011/0123289 A1 | 5/2011 | Pratt | |
| 2011/0166824 A1 | 7/2011 | Haisy et al. | |
| 2011/0239448 A1 | 10/2011 | Sarh | |
| 2012/0011702 A1 | 1/2012 | Pratt | |
| 2013/0014368 A1 | 1/2013 | Woods et al. | |
| 2013/0061452 A1 | 3/2013 | Pratt | |
| 2014/0130335 A1 * | 5/2014 | Bickford | F16B 31/06 29/525.02 |

FOREIGN PATENT DOCUMENTS

| | | |
|---|---|---|
| EP | 2329898 A1 | 6/2011 |
| WO | 9734733 | 9/1997 |
| WO | 2005097375 A1 | 10/2005 |

OTHER PUBLICATIONS

EP Office Action for related application 12174035.1-1709 dated Oct. 14, 2016; 8 pp.
European Search Report for Application No. 12174035.1; dated Oct. 23, 2012, 10 pages.
Notice of Reasons for Rejection, Application No. 2012-133358, dated May 10, 2016, pp. 9.
Patent Examination Report, Application No. 2012203058, dated May 31, 2016, pp. 3.
China Office Action for related application 2012102431332 dated Dec. 29, 2016; 19 pp.
Australian Office Action for related application 2016250320 dated Nov. 17, 2017; 4 pages.

* cited by examiner

SYSTEMS FOR IN-PROCESS QUALITY CONTROL DURING DRILL-FILL ASSEMBLY

CROSS REFERENCE TO RELATED APPLICATIONS

This application is a divisional and claims priority to U.S. patent application Ser. No. 13/183,670 filed Jul. 15, 2011, and subsequently issued as U.S. Pat. No. 9,032,602 issued on May 19, 2015, for "METHODS AND SYSTEMS FOR IN-PROCESS QUALITY CONTROL DURING DRILL-FILL ASSEMBLY", which is hereby incorporated by reference in its entirety.

BACKGROUND

The field of the disclosure relates generally to couplings made between two or more mechanical components, and more specifically, to methods and systems for in-process quality control during drill-fill assembly.

In the most relevant example, aerospace structure assembly generally requires multiple "touch" processes to complete installation of fasteners and acquire quality assurance acceptance. These multiple processes require significant flow time and therefore are subject to large labor costs. In addition, the staging of such an assembly process usually results in a significant amount of work in process as an assembly line generally incorporates only one process at a location. Further, and as understood by contemplation of the below mentioned process, assembly mechanics in the labor force may be exposed to repetitive motion injuries.

For example and to illustrate, fabrication of a typical aerospace assembly includes a first process to locate and drill the hole, a second process to complete a countersink associated with the drilled hole, a third process to inspect the hole and countersink, a fourth process to install the fastener and a fifth to inspect and accept the installation. Thousands upon thousands of such fastener installations are used in a typical airframe. Added to the above, after the drilling and countersinking steps are completed, an assembly may be disassembled for removal of burrs associated with the drilling of the holes. As such the assembly must be reassembled so that the fasteners may be installed. In summary, usual assembly requires temporary assembly, drilling, disassembly, reassembly and multiple inspection processes along the way.

There are efforts underway that address the disassembly of structures for the deburring of holes, for example, the use of interference fit fasteners that counteract the effects burrs have on the integrity of a structure. However, installation of fasteners, including blind-side fasteners and one-side fasteners common to aerospace structure fabrication are still subject to manual inspection and validation by quality assurance personnel. Required access to such assemblies for inspection slows the fabrication process.

BRIEF DESCRIPTION

In one aspect, a method for assembling a structure is provided. The method includes locating a position in an assembly stack-up where a one-sided fastener is to be installed, drilling a hole through the assembly stack-up at the position, countersinking the hole to a specified depth, operating a calibrated probe to determine at least parameter associated with one or more of the hole and the stack-up proximate the hole, inserting the one-sided fastener into the hole, applying a rotational torque to the one-sided fastener to complete installation of the one-sided fastener, and comparing a measurement of angular displacement required to complete installation of the one-sided fastener to a range of angular displacement indicative of correct installation of the fastener.

In another aspect, a method for verifying correct one-sided fastener installation is provided. The method includes rotating a bolt of the one-sided fastener until a torque required to rotate the bolt causes a drive head of the bolt to separate from the bolt, measuring a rotation of the bolt from a point where rotation of the bolt was initiated, to a point where the drive head separates from the bolt, and comparing the measured rotation to an expected rotation verify a correct installation of the fastener.

In still another aspect, a fastener insertion system is provided that includes a processing device and a rotation angle sensor communicatively coupled to the processing device. The system is operable to rotate a bolt of a one-sided fastener until a torque required to rotate the bolt causes a drive head of the bolt to separate from the bolt. The processing device is programmed to receive measurements of the rotation of the bolt by the system, determine an angle of rotation at which the drive head separated from the bolt, and compare the angle of rotation at which the drive head separated from the bolt to known values associated with the fastener.

The features, functions, and advantages that have been discussed can be achieved independently in various embodiments or may be combined in yet other embodiments further details of which can be seen with reference to the following description and drawings.

DETAILED DESCRIPTION

The described embodiments are directed to a one-sided fill-drill process using a one-sided fastener. As further described herein, a hole is drilled through a stack-up assembly, countersunk, and measurements are taken of the countersink, the hole diameter and a thickness of the stack-up assembly. The fastener having the correct grip length is chosen based on the thickness measurement and installed all in one step. When a drive head of the fastener is rotated for final installation, and ultimately removed from the bolt through application of torque, such torque is monitored and correlated with torque data taken in tests and/or prior fastener installations to determine whether or not the fastener installation was performed correctly. As such, no post installation inspection related to the fastener is necessary.

In embodiments, an amount of rotation imparted onto the drive head until it breaks free from the remainder of the bolt is measured. For a proper fastener installation, a specific amount of rotation, within a range, is expected. The measured rotation, for example in degrees, is measured and compared to the expected range of rotation, for example as taken in tests and/or prior fastener installations to determine whether or not the fastener installation was performed correctly.

Figure 1:
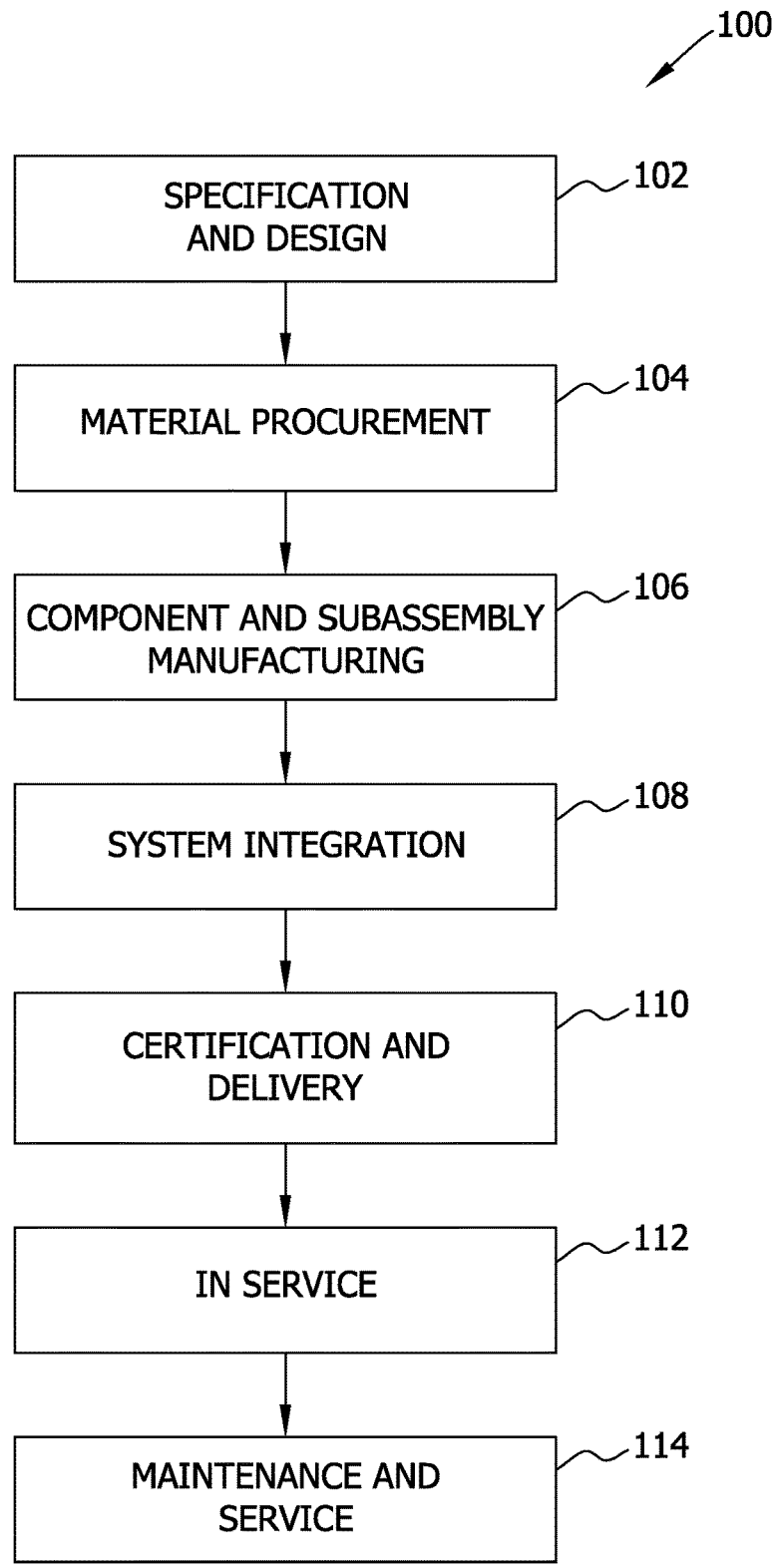
FIG. 1 is a flow diagram of an aircraft production and service methodology.
Figure 2:
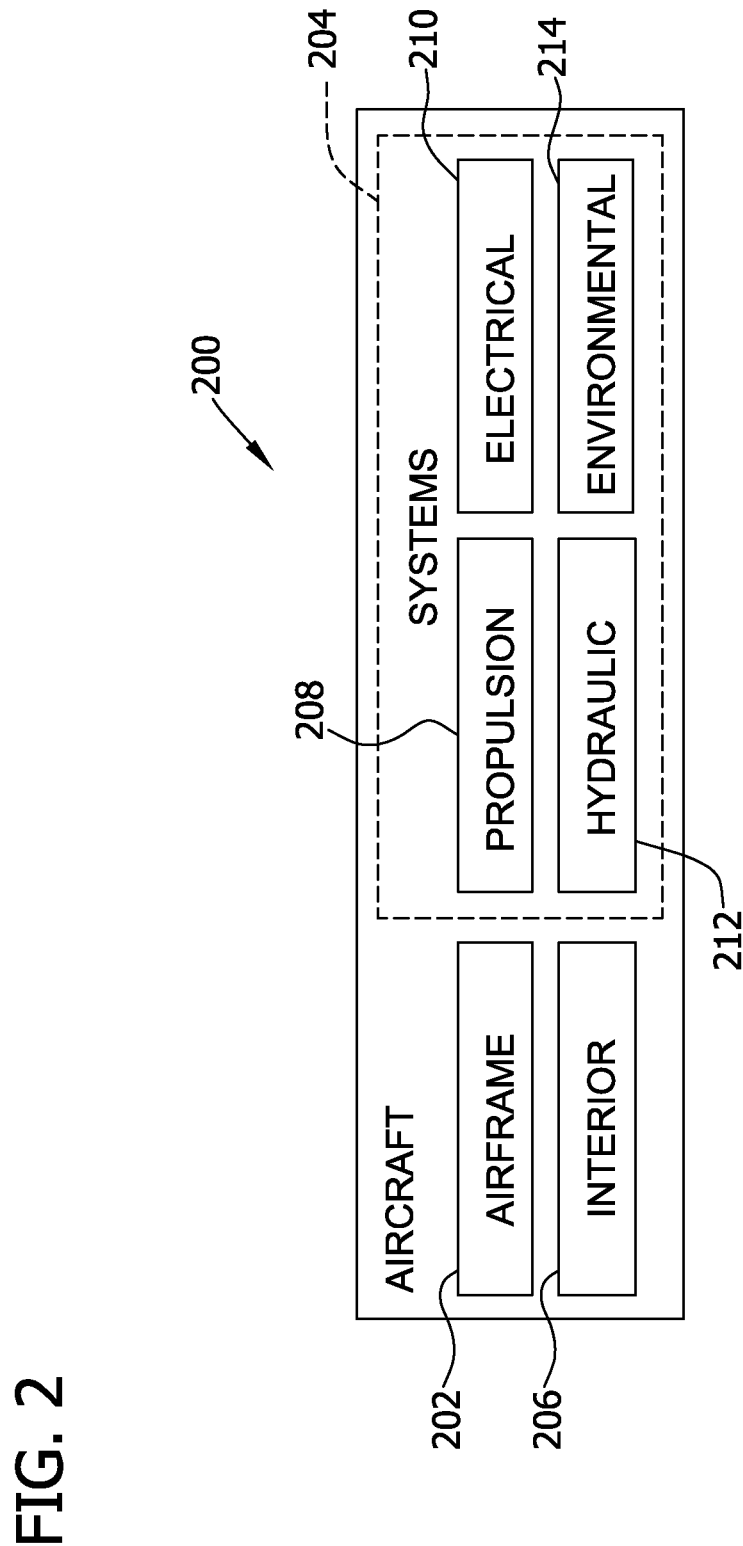
FIG. 2 is a block diagram of an aircraft.

Referring more particularly to the drawings, embodiments of the disclosure may be described in the context of aircraft manufacturing and service method 100 as shown in FIG. 1 and an aircraft 200 as shown in FIG. 2. During pre-production, aircraft manufacturing and service method 100 may include specification and design 102 of aircraft 200 and material procurement 104.

During production, component and subassembly manufacturing 106 and system integration 108 of aircraft 200 takes place. Thereafter, aircraft 200 may go through certification and delivery 110 in order to be placed in service 112. While in service by a customer, aircraft 200 is scheduled for routine maintenance and service 114 (which may also include modification, reconfiguration, refurbishment, and so on).

Each of the processes of aircraft manufacturing and service method 100 may be performed or carried out by a system integrator, a third party, and/or an operator (e.g., a customer). For the purposes of this description, a system integrator may include, without limitation, any number of aircraft manufacturers and major-system subcontractors; a third party may include, for example, without limitation, any number of venders, subcontractors, and suppliers; and an operator may be an airline, leasing company, military entity, service organization, and so on.

As shown in FIG. 2, aircraft 200 produced by aircraft manufacturing and service method 100 may include airframe 202 with a plurality of systems 204 and interior 206. Examples of systems 204 include one or more of propulsion system 208, electrical system 210, hydraulic system 212, and environmental system 214. Any number of other systems may be included in this example. Although an aerospace example is shown, the principles of the disclosure may be applied to other industries, such as the automotive industry.

Apparatus and methods embodied herein may be employed during any one or more of the stages of aircraft manufacturing and service method 100. For example, without limitation, components or subassemblies corresponding to component and subassembly manufacturing 106 may be fabricated or manufactured in a manner similar to components or subassemblies produced while aircraft 200 is in service.

Also, one or more apparatus embodiments, method embodiments, or a combination thereof may be utilized during component and subassembly manufacturing 106 and system integration 108, for example, without limitation, by substantially expediting assembly of or reducing the cost of aircraft 200. Similarly, one or more of apparatus embodiments, method embodiments, or a combination thereof may be utilized while aircraft 200 is in service, for example, without limitation, to maintenance and service 114 may be used during system integration 108 and/or maintenance and service 114 to determine whether parts may be connected and/or mated to each other.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

Figure 3:
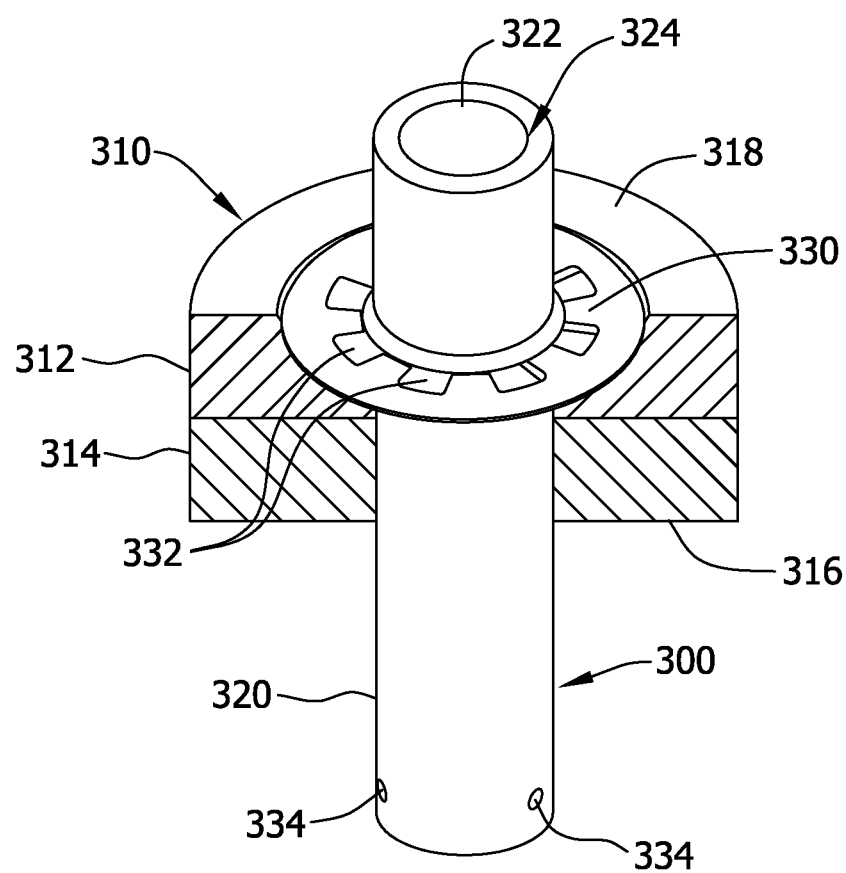
FIG. 3 is an illustration of a one sided fastener inserted through a hole in an assembly.

FIG. 3 is an illustration of a one-sided fastener 300 that has been inserted into an assembly 310, shown in cut away view, made up of a front layer 312 and a back layer 314. The back layer 314 has a backside 316 and the front layer 312 has a front side 318. Fastener 300 includes a nut body 320 and a core bolt 322. The core bolt 322 includes a lower portion (not shown in FIG. 3) that extends through the nut body 320 and a frangible drive head 324. A portion of the nut body 320 is formed as an anti-rotation flange 330 with an anti-rotation recess pattern 332 formed therein. Nut body 320 also includes a thread lock 334 for engaging threads (not shown in FIG. 3) of the core bolt 322. Fastener 300 is shown in an "off-the-shelf" configuration. Upon completion of the hole drilling process through assembly 310, the fastener 300 is inserted into the hole until the anti-rotation flange 330 is adjacent the front side 318 of the front layer 312 as shown.

Fastener 300 is inserted into assembly 310 using an end effector module. A driver of the end effector module includes one or more protruding tools that engage the anti-rotation recess pattern 332 to prevent rotation of the nut body 320 during the final installation when the driver of the end effector module engages the drive head 324 and initiates rotation of the core bolt 322.

Figure 4:
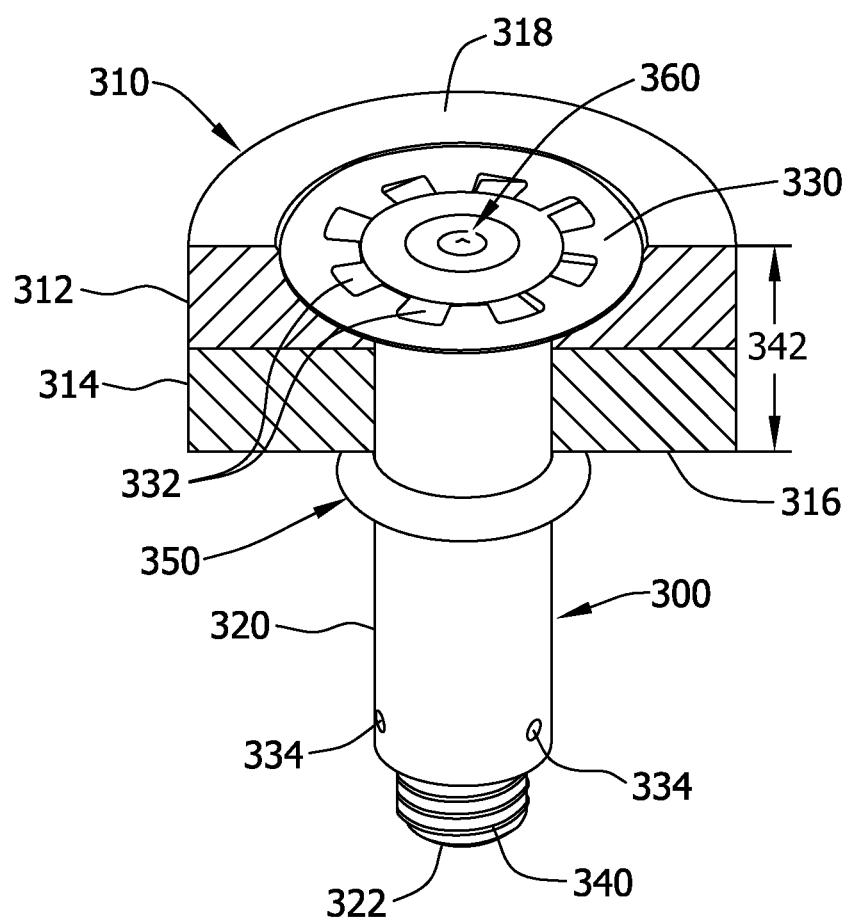
FIG. 4 is an illustration of the bolt of FIG. 3, the drive head having been rotated until a bulb has been formed in the nut body on the underside of the assembly and the drive head broken away from the remainder of the bolt.
Figure 5:
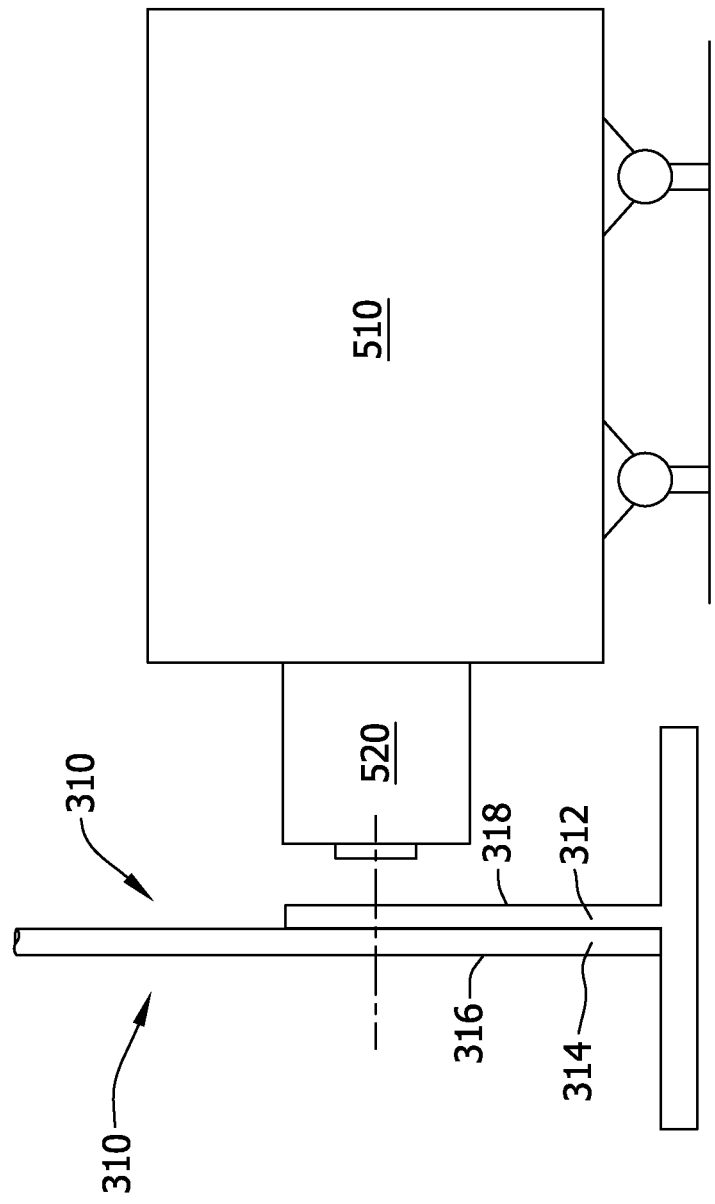
FIG. 5 is a diagram illustrating a numeric controlled drill-fill system located to a drilling location where a front layer and a back layer of an assembly are held in position with respect to one another.

Now referring to FIG. 4, as the core bolt 322 is rotated, the thread lock 334 is caused to move up the threads 340 of the core bolt 322 thereby causing a bulb 350 to be formed in a weakened portion of the nut body 320, the bulb 350 being formed substantially adjacent the backside 316 of the back layer 314. As is understood, upon formation, the bulb 350 operates substantially in the same manner as a conventional nut with core bolt 322 and the anti-rotation flange to hold the front layer 312 and back layer 314 together.

Once the bulb 350 is properly formed, rotation of core bolt becomes increasingly difficult until a specified torque range is achieved at which point the drive head 324 separates from a remainder 360 of the core bolt 322 which is configured to be substantially flush with front surface 318 of assembly 310.

Turning now to FIGS. 5-11, the process for fabricating assembly 310 is further described. As mentioned above, fastener 300 (not shown in FIG. 5) is utilized to provide an attachment between front layer 312 and back layer 314. A numeric controlled drill-fill system 510 is utilized, which locates to a drilling location, for example using a vision system at least partially located in end effector 520 to locate a reference point, such as a reference hole formed in assembly 310. In embodiments, drill fill system operates to press front layer 312 and back layer 314 together and is programmed to move to a drilling location that is referenced with respect to the reference point.

Figure 6:
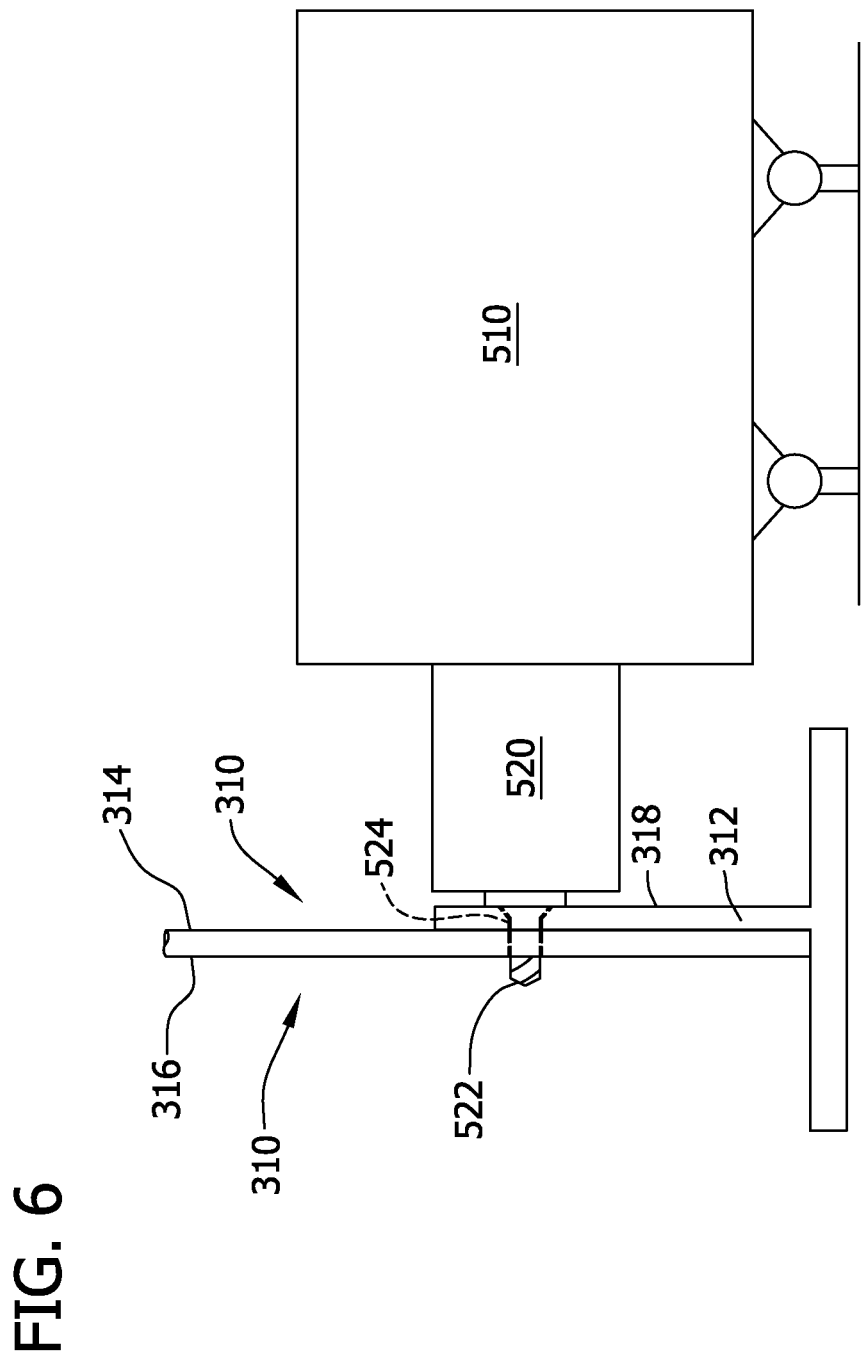
FIG. 6 is a diagram illustrating the numeric controlled drill-fill system of FIG. 5 drilling a hole through the assembly.

As shown in FIG. 6, drill-fill system 510 extends end effector 520 incorporating a drill bit 522 towards front layer 312 and back layer 314 and commences to drill a hole 524 therethrough. Depending upon which type of fastener is to be utilized, drill-fill system 510 may be operated to provide a countersink (as shown) such that upon completion of fastener 300 installation, fastener 300 and front surface 318 form a flush surface.

Figure 7:
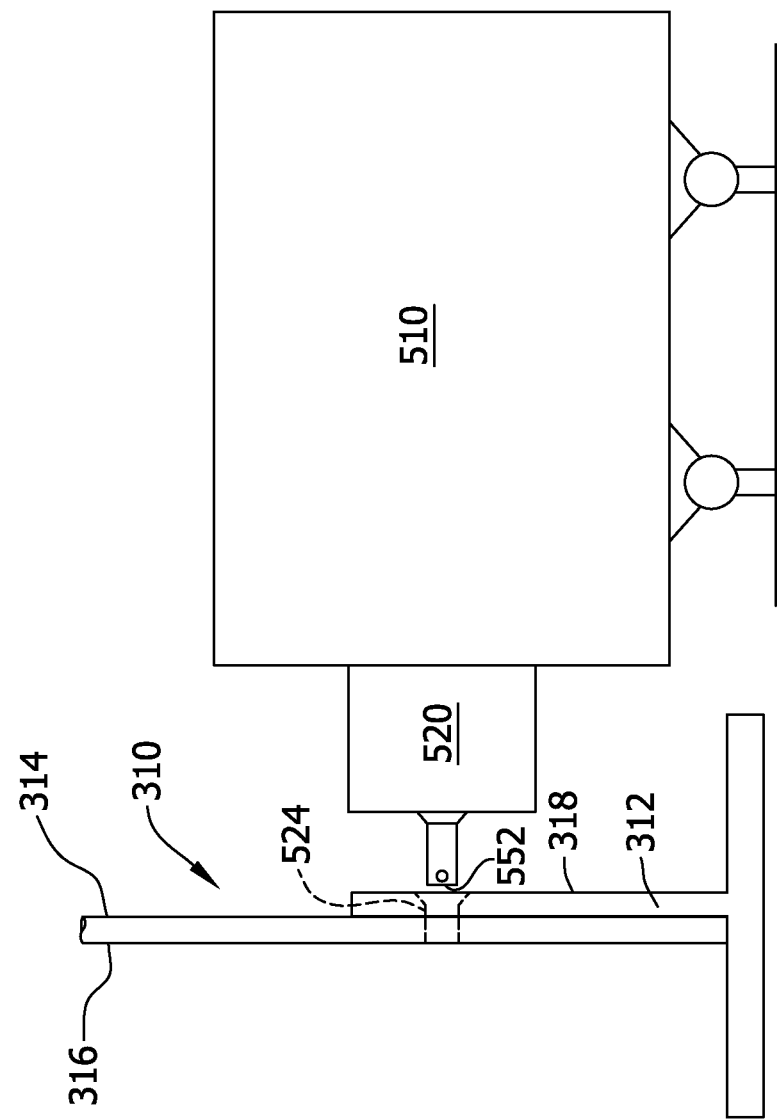
FIG. 7 is a diagram illustrating the numeric controlled drill-fill system of FIG. 5 using a calibrated probe to check hole diameter, stack thickness, countersink depth, and the like in the assembly.

FIG. 7 illustrates that the drill bit 522 of drill-fill system 510 has been removed from hole 324 and replaced with a calibrated probe 552. Calibrated probe 552 and drill-fill system 510 are automated and operate to check hole diameter, stack thickness, countersink depth, gaps and the like between front layer 312 and back layer 314.

Figure 8:
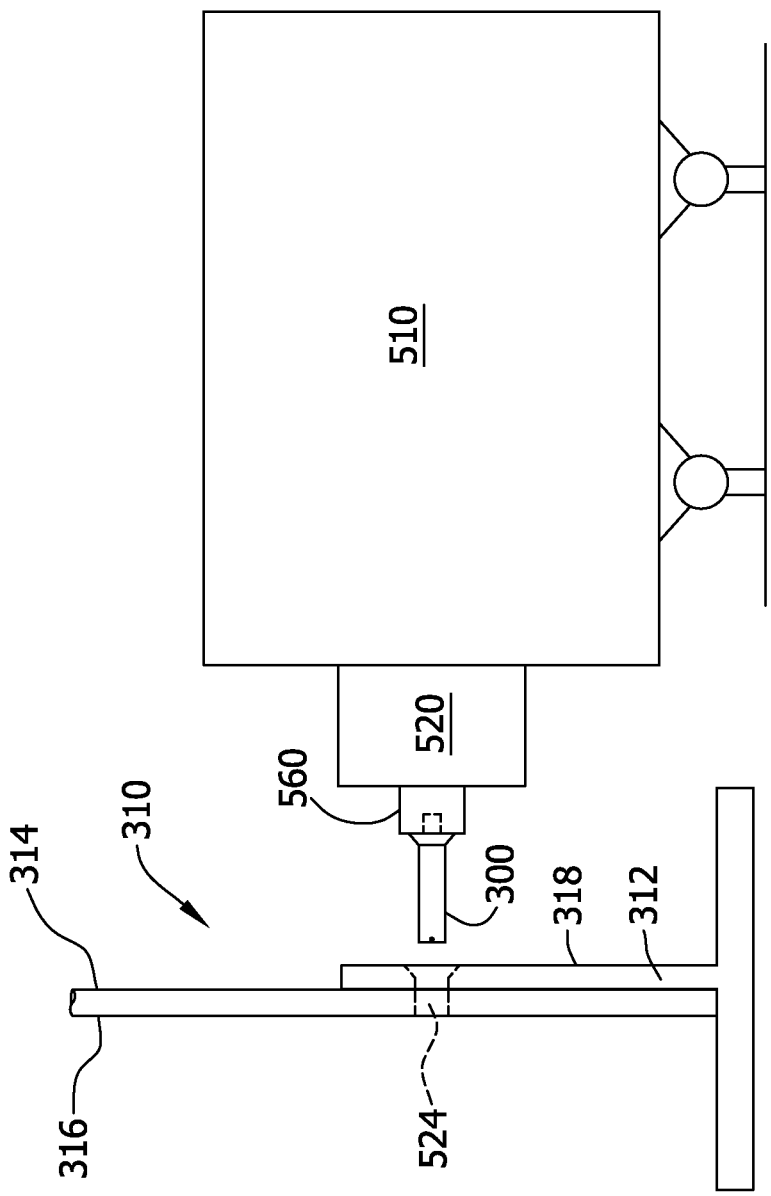
FIG. 8 illustrates a fastener feed head of the drill-fill system being utilized to insert a fastener into the hole.

Once drill-fill system 510 has verified that the assembly 310 and the hole 524 extending therethrough meet specifications, a fastener feed head 560 is utilized by drill-fill system 310 to insert a fastener 300 into the hole 524, as shown in FIG. 8. In one embodiment, drill-fill system 510 selects the fasteners 300 based on the above described thickness measurements such that the fastener 300 has a correct grip length 342 for the assembly 310 in which it is being utilized. In certain embodiments, drill-fill system 510 verifies a length of the fastener 300, and/or verifies that the fastener 300 incorporates the proper size and length of threads therein.

Figure 9:
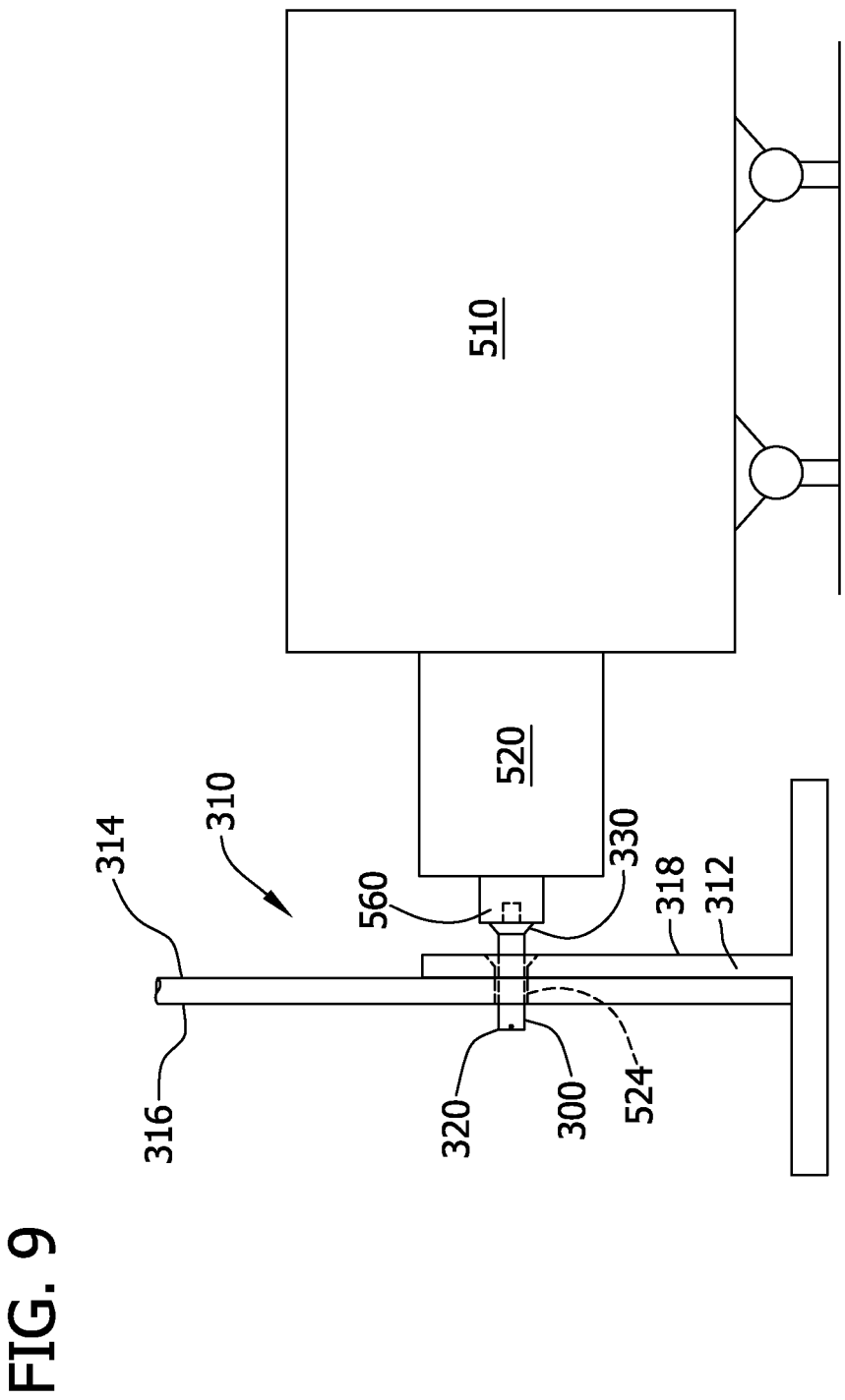
FIG. 9 shows that the drill-fill system inserts the fastener into the hole until an anti-rotation flange touches the front surface of the assembly.
Figure 10:
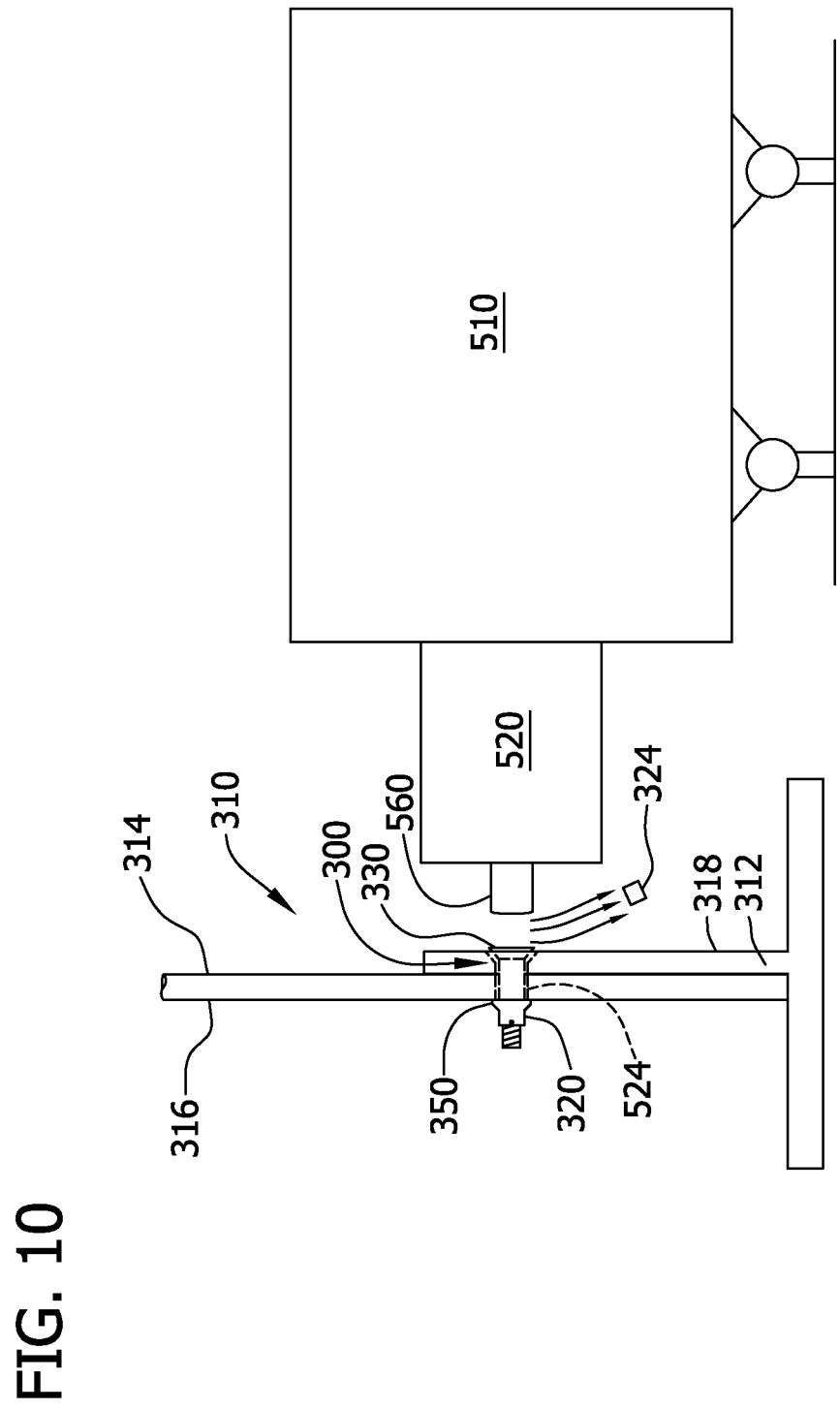
FIG. 10 illustrates drill-fill system as having operated the fastener to form a bulb on a backside on the assembly via bolt rotation as well as the breaking off of the drive head of the bolt.

FIG. 9 shows that drill-fill system 510 inserts fastener 300 into hole 524. The fastener 300 is inserted until anti-rotation flange 330 touches the front surface 318 of the assembly 310 and the nut body 320 extends from the distal side. Fastener feed head 560 also operates as a driver and engages the anti-rotation flange 330 to prevent rotation of the nut body 320 during the final installation when the driver engages the drive head 324 and initiates rotation of the core bolt 322 until the bulb 350 is formed and the drive head 324 breaks free as described above and as depicted in FIG. 10.

Figure 11:
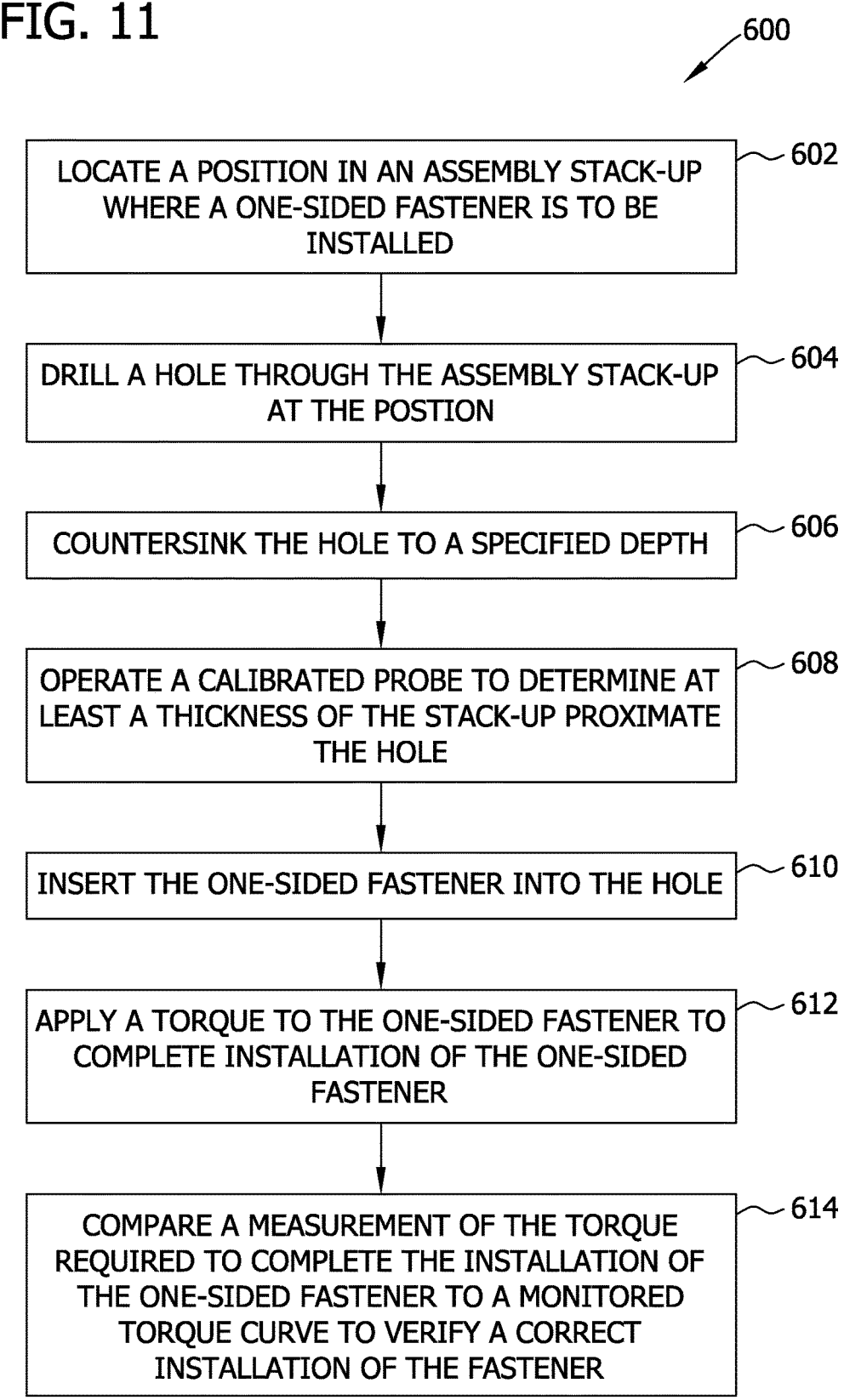
FIG. 11 is a flowchart illustrating a method for assembling a structure utilizing the described embodiments.

FIG. 11 is a flowchart 600 illustrating the above described method for assembling a structure such as assembly 310. The method includes locating 602 a position in an assembly stack-up where a one-sided fastener (e.g., fastener 300) is to be installed, drilling 604 a hole through the assembly stack-up at the position, countersinking 606 the hole 524 to a specified depth, operating 608 a calibrated probe 552 to determine at least a thickness of the stack-up proximate the hole, inserting 610 the one-sided fastener into the hole, applying 612 a torque to the one-sided fastener to complete installation of the one-sided fastener, and comparing 614 a measurement of the torque required to complete the installation of the one-sided fastener to a monitored torque-angle curve (sometimes referred to as a torque range curve) to verify a correct installation of the fastener.

Additionally or alternatively, the method may include comparing a measurement of angular displacement required to fracture the drive head 324 from the core bolt 322 during installation of the one-sided fastener 300 to a range of angular displacement indicative of correct installation of the fastener to verify a correct installation of the fastener.

In embodiments, locating 602 a position in an assembly stack-up includes locating a reference on the assembly stack-up, and locating the position for the one-sided fastener installation with respect to the reference location. Further, insertion of the one-sided fastener 300 into the hole 524 includes comprises selecting a one-sided fastener 300 having a grip length based on the determined thickness of the stack-up assembly 310.

With regard to validation using the calibrated probe 552, as described herein, it is operable to verify a diameter of the drilled hole 524, verify a countersink depth associated with the drilled hole 524, and measure a thickness of the assembly 310 proximate the hole 524. Other validation processes may include, based on measurements of torque and angle of rotation, a flushness and a protrusion of the fastener and/or a fastener bulb diameter associated with the installed fastener.

As described herein, the embodiments are directed to a fastener 300 where application of torque to the fastener 300 operates to complete installation of the fastener 300 through rotation of a bolt 322 of the fastener 300 until a frangible drive head 324 breaks away from a remainder of the bolt 322 due to an increase of the torque required to rotate the bolt 322 which is further due to the bulb being drawn up against the backside 316 of the assembly such that the nut body 320 can no longer be drawn up the bolt 322.

The embodiments also lead to a method for verifying correct one-sided fastener installation that includes rotating a bolt 322 of the one-sided fastener 300 until a torque required to rotate the bolt 322 causes a drive head 324 of the bolt 322 to separate therefrom, receiving a measurement of the torque at which the drive head 324 separated from the bolt 322, and comparing the torque measurement to a torque-angle curve or torque range associated with the fastener 300 to verify a correct installation of the fastener 300. Rotating a bolt of the one-sided fastener causes a bulb 350 in a one piece nut body 320 associated with the bolt 322 to be formed on a backside of an assembly stack-up. Further, a rotation of the bolt 322 from a point where rotation of the bolt 322 was initiated, to a point where the drive head 324 separates from the bolt 322 can be measured so that the measured rotation, for example, in degrees, can be compared to an expected rotation to further verify correct installation of the fastener 300. Such rotation measurement may also be considered an alternative verification of correct fastener installation.

Figure 12:
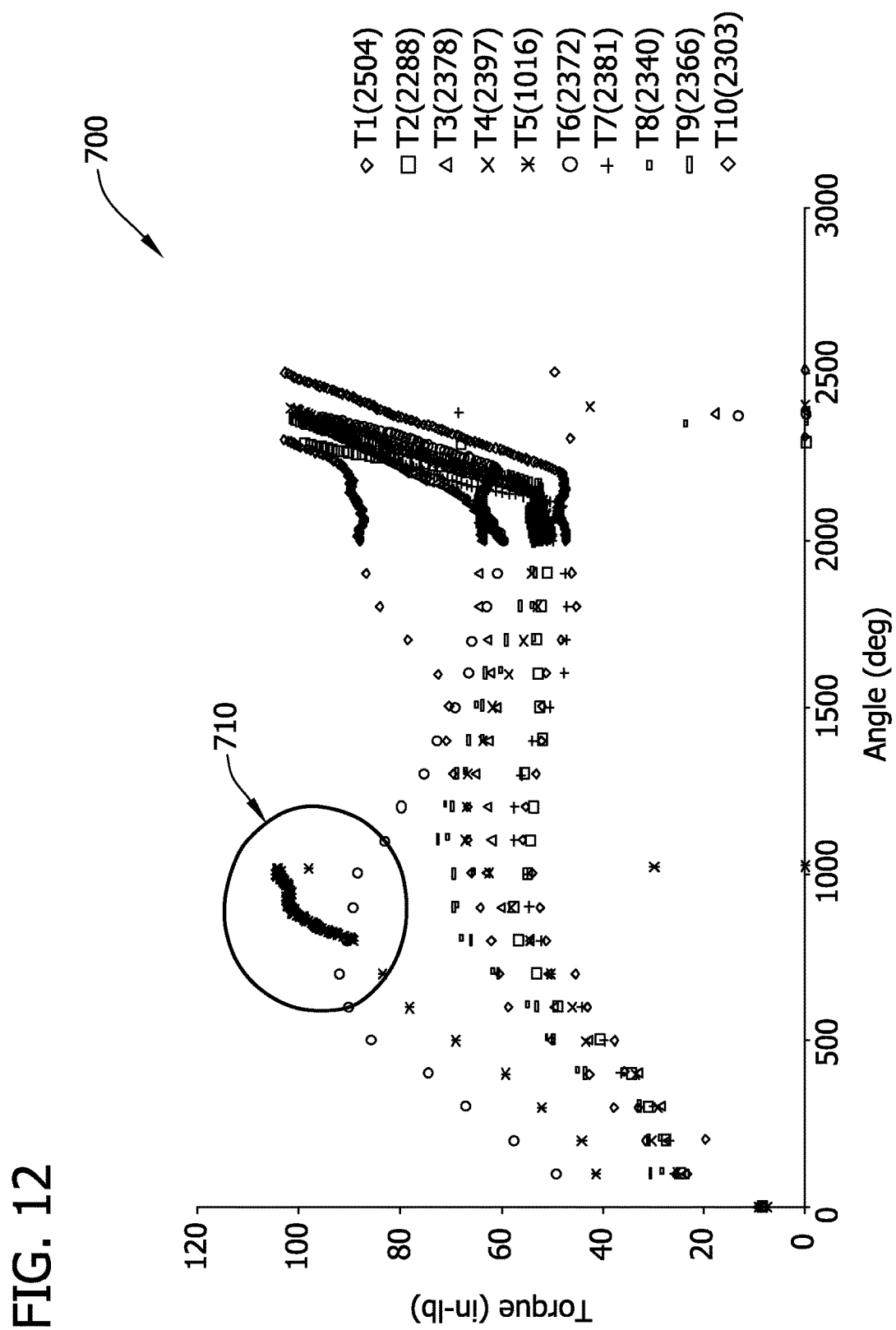
FIG. 12 is a torque-angle plot of fastener installation.

FIG. 12 is a torque angle plot 700 related to the installation of ten fasteners 300. As shown for nine of the fasteners 300, at about 2250 degrees of rotation (slightly over six complete rotations), the torque value become exponential indicating that the bulb 350 has formed and that the bolt 322 is difficult to turn, which as described herein leads to the separation of the drive head 324 from the bolt 322. Through monitoring of the rotation and or torque, and comparing to test data or prior installation data such as a torque range it can be determined that a fastener is correctly installed. However, for a tenth fastener, the plot 710 indicates an increase in torque after less than 1000 degrees of rotation. Such may be an indicator of incorrect installation and is indicative of, for example, improper formation of bulb 350, selection of an incorrect or defective fastener 300, or an issue with the drilled hole.

Figure 13:
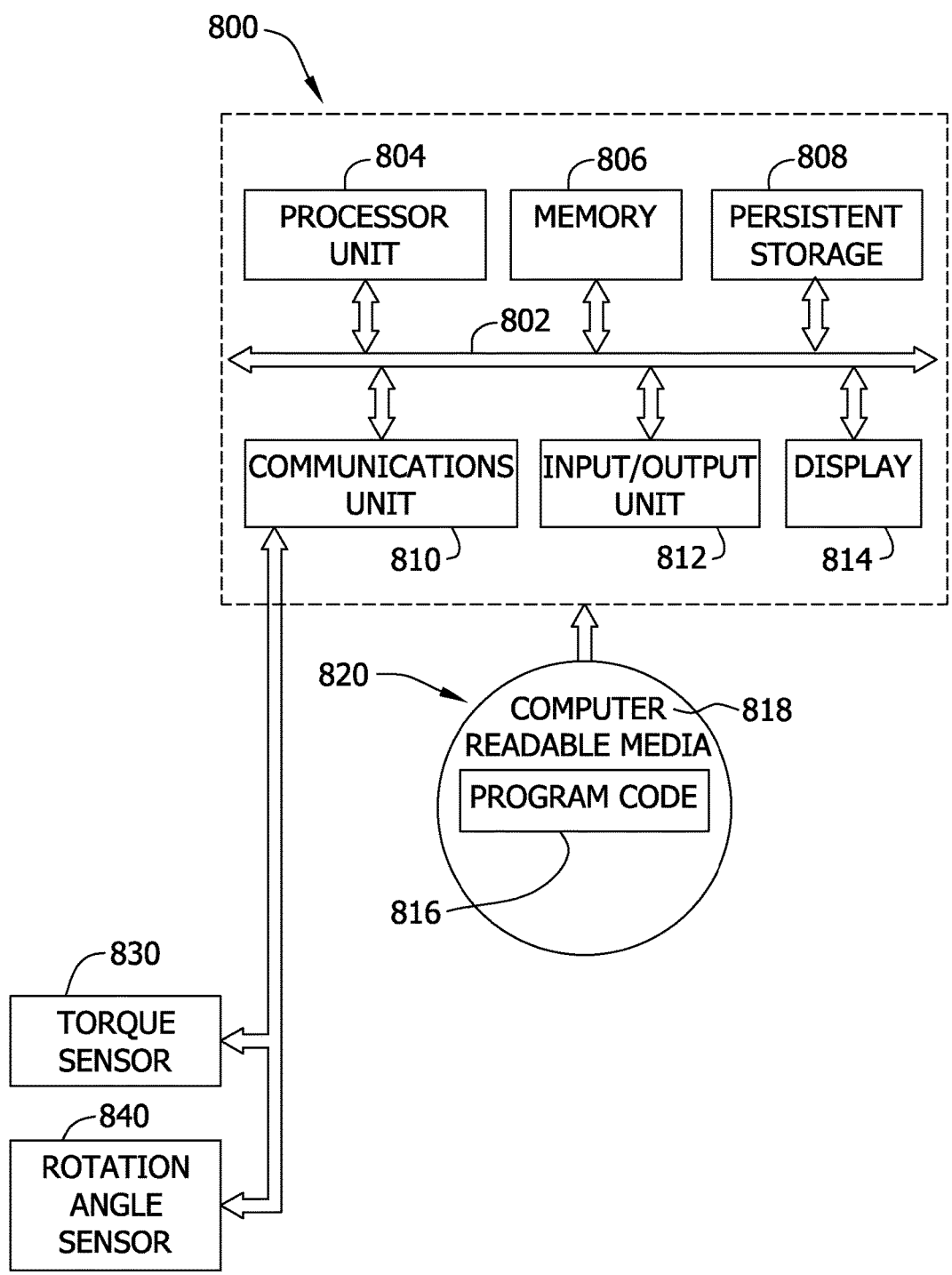
FIG. 13 is a diagram of a data processing system that includes a torque sensor and a rotation angle sensor.

FIG. 13 is a diagram of a data processing system that might be incorporated within the above described drill-fill system 510. In this illustrative example, data processing system 800 includes communications fabric 802, which provides communications between processor unit 804, memory 806, persistent storage 808, communications unit 810, input/output (I/O) unit 812, and display 814. The data processing system 800 may include, as is understood from a review of the embodiments described herein, a torque sensor 830 and a rotation angle sensor 840 operatively placed for use in sensing the torque required to break off a drive head 324 and recording the number of rotations of a bolt 322 prior to the drive head 324 breaking off. Torque sensor 830 and rotation angle sensor 840 may communicate through the communications unit 810 as shown or may communicate directly with processor unit 804 in other embodiments. It should be understood that data processing system 800 is but one embodiment of a data processing system that might be utilized in the described embodiments. Other architectures and configurations of data processing systems capable of receiving sensor data from torque sensor 830 and rotation angle sensor 840 are known.

Continuing, processor unit 804 serves to execute instructions for software that may be loaded into memory 806. Processor unit 804 may be a set of one or more processors or may be a multi-processor core, depending on the particular implementation. Further, processor unit 804 may be implemented using one or more heterogeneous processor systems in which a main processor is present with secondary processors on a single chip. As another illustrative example, processor unit 804 may be a symmetric multi-processor system containing multiple processors of the same type.

Memory 806 and persistent storage 808 are examples of storage devices. A storage device is any piece of hardware that is capable of storing information either on a temporary basis and/or a permanent basis. Memory 806, in these examples, may be, for example, without limitation, a random access memory or any other suitable volatile or non-volatile storage device. Persistent storage 808 may take various forms depending on the particular implementation. For example, without limitation, persistent storage 808 may contain one or more components or devices. For example, persistent storage 808 may be a hard drive, a flash memory, a rewritable optical disk, a rewritable magnetic tape, or some combination of the above. The media used by persistent storage 808 also may be removable. For example, without limitation, a removable hard drive may be used for persistent storage 808.

Communications unit 810, in these examples, provides for communications with other data processing systems or devices. In these examples, communications unit 810 is a network interface card. Communications unit 810 may provide communications through the use of either or both physical and wireless communication links.

Input/output unit 812 allows for input and output of data with other devices that may be connected to data processing system 800. For example, without limitation, input/output unit 812 may provide a connection for user input through a keyboard and mouse. Further, input/output unit 812 may send output to a printer. Display 814 provides a mechanism to display information to a user.

Instructions for the operating system and applications or programs are located on persistent storage 808. These instructions may be loaded into memory 806 for execution by processor unit 804. The processes of the different embodiments may be performed by processor unit 804 using computer implemented instructions, which may be located in a memory, such as memory 806. These instructions are referred to as program code, computer usable program code, or computer readable program code that may be read and executed by a processor in processor unit 804. The program code in the different embodiments may be embodied on different physical or tangible computer readable media, such as memory 806 or persistent storage 808.

Program code 816 is located in a functional form on computer readable media 818 that is selectively removable and may be loaded onto or transferred to data processing system 800 for execution by processor unit 804. Program code 816 and computer readable media 818 form computer program product 820 in these examples. In one example, computer readable media 818 may be in a tangible form, such as, for example, an optical or magnetic disc that is inserted or placed into a drive or other device that is part of persistent storage 808 for transfer onto a storage device, such as a hard drive that is part of persistent storage 808. In a tangible form, computer readable media 818 also may take the form of a persistent storage, such as a hard drive, a thumb drive, or a flash memory that is connected to data processing system 800. The tangible form of computer readable media 818 is also referred to as computer recordable storage media. In some instances, computer readable media 818 may not be removable.

Alternatively, program code 816 may be transferred to data processing system 800 from computer readable media 818 through a communications link to communications unit 810 and/or through a connection to input/output unit 812. The communications link and/or the connection may be physical or wireless in the illustrative examples. The computer readable media also may take the form of non-tangible media, such as communications links or wireless transmissions containing the program code.

In some illustrative embodiments, program code 816 may be downloaded over a network to persistent storage 808 from another device or data processing system for use within data processing system 800. For instance, program code stored in a computer readable storage medium in a server data processing system may be downloaded over a network from the server to data processing system 800. The data processing system providing program code 816 may be a server computer, a client computer, or some other device capable of storing and transmitting program code 816.

The different components illustrated for data processing system 800 are not meant to provide architectural limitations to the manner in which different embodiments may be implemented. The different illustrative embodiments may be implemented in a data processing system including components in addition to or in place of those illustrated for data processing system 800. Other components shown in FIG. 13 can be varied from the illustrative examples shown.

As one example, a storage device in data processing system 800 is any hardware apparatus that may store data. Memory 806, persistent storage 808 and computer readable media 818 are examples of storage devices in a tangible form.

In another example, a bus system may be used to implement communications fabric 802 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, without limitation, memory 806 or a cache such as that found in an interface and memory controller hub that may be present in communications fabric 802.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A fastener insertion system for use with an assembly stack-up, said fastener insertion system comprising:
   a one-sided fastener comprising a core bolt and a nut body;
   an end effector positioned at a location where said one-sided fastener is to be installed on the assembly stack-up, said end effector comprising:
      a drill bit configured to drill a hole through the assembly stack-up at the location;
      an automated calibrated probe configured to determine at least one parameter associated with the stack-up proximate the hole; and
      a fastener feed head configured to install the one-sided fastener into the hole and apply rotational torque to the core bolt to complete installation of the one-sided fastener, wherein said nut body comprises an anti-rotation flange configured to be engaged by said fastener feed head;
   a processing device; and
   a rotation angle sensor communicatively coupled to said processing device and to said end effector, said processing device programmed to:
      measure, with the rotation angle sensor, an amount of angular displacement required to complete installation of the one-sided fastener after applying the rotational torque to the core bolt, wherein said rotation angle sensor is configured to measure rotation of said core bolt;
      transmit a signal representative of the measured amount of angular displacement from the angle sensor to the processing device; and
      compare the measurement of angular displacement required to complete installation of the one-sided fastener to a range of angular displacement indicative of correct installation of the fastener.

2. The fastener system according to claim 1 further comprising a torque sensor communicatively coupled to said processing device, said processing device programmed to:
   measure an amount of torque required to complete installation of the one-sided fastener with said torque sensor;
   transmit a signal representative of the measured amount of torque from the torque sensor to the processing device; and
   compare the measurement of the torque required to complete the installation of the one-sided fastener to a monitored torque-angle curve.

3. The fastener system according to claim 1, wherein said one sided fastener comprises a bulb and installation of said one-sided fastener is completed by securing a portion of the assembly stack-up between the anti-rotation flange and the bulb.

4. The fastener system according to claim 1, wherein said drill bit is configured to countersink the hole to a specified depth.

5. The fastener system according to claim 1, wherein the at least one parameter associated with the stack-up to be determined by said calibrated probe includes at least a stack-up thickness.

6. The fastener system according to claim 5, wherein said one-sided fastener includes a grip length, said one-sided fastener selected based on the determined thickness of the stack-up.

7. The fastener system according to claim 1, wherein said fastener feed head is operable to rotate said core bolt until a torque required to rotate said core bolt causes a drive head of said core bolt to separate from said core bolt.

8. The fastener system according to claim 7 wherein said processing device is programmed to compare the torque measurement and angle of rotation at which said drive head separated from said core bolt to a torque rotation curve to determine if said one-sided fastener was installed correctly.

9. The fastener system according to claim 8 wherein the torque rotation curve is generated from at least one of fastener installation test data and torque angle data generated from prior fastener installations.

* * * * *